(12) United States Patent
Matsunaga et al.

(10) Patent No.: US 6,391,383 B1
(45) Date of Patent: May 21, 2002

(54) HIGH EMITTANCE GLASS COATING MATERIAL, HIGH EMITTANCE GLASS COATING, AND METHOD OF PRODUCING HIGH EMITTANCE GLASS COATING

(75) Inventors: Hirokazu Matsunaga, Tsushima; Misao Iwata, Nagoya; Shinji Kato, Nishikamo-gun; Kenji Yano, Kasugai; Kazuhiro Horimi, Kariya; Yoshitsugu Kato, Toyota; Takamitsu Isogai, Nishikamo-gun; Masakazu Hiyoshi, Nagoya; Takamitsu Fukui, Takahama, all of (JP)

(73) Assignee: Noritake Co., Ltd., Aichi (JP)

( * ) Notice: Subject to any disclaimer, the term of this patent is extended or adjusted under 35 U.S.C. 154(b) by 0 days.

(21) Appl. No.: 09/194,443
(22) PCT Filed: Apr. 9, 1998
(86) PCT No.: PCT/JP98/01649
§ 371 Date: Nov. 27, 1998
§ 102(e) Date: Nov. 27, 1998
(87) PCT Pub. No.: WO98/46539
PCT Pub. Date: Oct. 22, 1998

(30) Foreign Application Priority Data

Apr. 11, 1997 (JP) .............................................. 9-94095

(51) Int. Cl.⁷ ................................................ B05D 7/00
(52) U.S. Cl. ...................... 427/219; 427/218; 427/279; 427/372.2; 427/377; 427/397.7; 427/421; 428/404; 428/406; 428/428; 428/446; 428/325; 428/336; 501/32; 106/287.1; 106/287.34
(58) Field of Search .................... 428/404, 406, 428/336, 403, 325, 446, 428, 332; 427/219, 218, 215, 216, 279, 372.2, 377, 397.7, 421; 501/32; 106/286.1, 287.1, 287.34

(56) References Cited

U.S. PATENT DOCUMENTS 4,093,771 A 6/1978 Goldstein et al.
5,079,082 A 1/1992 Leiser et al.
5,518,778 A 5/1996 Solovjeva et al.
5,609,961 A 3/1997 Solovjeva et al.
5,958,583 A * 9/1999 Rorabaugh et al.
6,054,546 A * 4/2000 Suzuki et al.
6,136,083 A * 10/2000 Schmidt et al.

FOREIGN PATENT DOCUMENTS

EP 0 672 631 A1 9/1995
JP A-7-315964 12/1995

OTHER PUBLICATIONS

Misao Iwata et al., "Proposal of innovative coating method with high emittance at high temperatures", EC–vol. 5, 1997 Joint Power Generation Conference, vol. 1 ASME 1997, No Month.

H.E. Goldstein et al., "Reaction cured borosilicate glass coating for low density fibrous silica insulation" No Date.

"Chemical Abstracts+ Indexes, US, American Chemical Society. Columbus" No Date.

* cited by examiner

Primary Examiner—Deborah Jones
Assistant Examiner—Wendy Boss
(74) Attorney, Agent, or Firm—Oliff & Berridge, PLC

(57) ABSTRACT

A high emittance glass coating material which is applied to a surface of a specific structural body and fired on the surface, for providing on the surface a glass coating having a glass structure in which pigment particles having a predetermined degree of emissivity are dispersed, the high emittance glass coating material being characterized by including: a pigment covering film having a predetermined thickness, which is provided to cover each of the pigment particles, and which includes silicon dioxide ($SiO_2$) such that a content of the silicon dioxide in the pigment covering film is higher than a content of the silicon dioxide in each portion of the glass structure which is adjacent to a corresponding one of the pigment particles.

25 Claims, 6 Drawing Sheets

(COVERING OF PIGMENT)

HIGH EMITTANCE GLASS COATING MATERIAL, HIGH EMITTANCE GLASS COATING, AND METHOD OF PRODUCING HIGH EMITTANCE GLASS COATING

TECHNICAL FIELD

The present invention relates in general to a high emittance glass coating which is provided on surfaces of various kinds of structures for the purpose of increasing an emissivity of the structures, and a method of producing the high emittance glass coating. Also, the present invention is concerned with an improvement in a high emittance glass coating material which is used for forming the high emittance glass coating.

BACKGROUND ART

A heat insulator system serving for an aerospace or ultra-supersonic aviation, for example, is required to have an excellent heat resistance and a high emittance. Thus, a structural body used for such a purpose is provided on its surface with a glass coating having high emittance, such as a light-weight inorganic fibrous refractory which constitutes an outer wall of a space shuttle of the National Aeronautics and Space Administration (NASA). An example of the glass coating is disclosed in U.S. Pat. No. 4,093,771. This glass coating is constituted, for example, by a glass structure composed of a reaction cured glass (RCG) of a high silica borosilicate, and a high emittance pigment consisting of molybdenum disilicide ($MoSi_2$) or a boron silicide compound such as silicon tetraboride ($SiB_4$) or silicon hexaboride ($SiB_6$), such that the high emittance pigment is dispersed in the glass structure. Thus, the glass structure is constituted by the reaction cured glass of the high silica borosilicate which has a high degree of heat resistance, and the high emittance pigment is dispersed in the glass structure, thereby providing the glass coating with a high heat resistance and a high emittance.

The above-described glass coating is produced, for example, as follow. That is, a predetermined amount of boron oxide is first mixed with a glass powder including a high silica glass. The mixture is fired and ground, for thereby producing a reaction cured glass powder. Next, the high emittance pigment is added to the thus produced reaction cured glass powder, for preparing a glass paste. The glass paste is applied to the surface of the light-weight refractory or other structural body. The applied glass paste is dried and then fired so that the glass structure constituting the above-described glass coating is formed from the glass powder. It is known that restraining oxidation of the high emittance pigment in the firing step is essential in the above production process where a non-oxide such as the above-described boron silicide compound is used as the high emittance pigment, in view of a fact that the boron silicide compound is decomposed into silicon oxide and boron oxide when the boron silicide is oxidized, whereby the pigment no longer provides the required optical properties such as high emissivity.

According to the technique disclosed in the above-identified U.S. Pat. No. 4,093,771, the decomposition of the high emittance pigment is restrained by rapidly heating the glass paste in the firing step. That is, the rapid heating of the glass paste leads to a rapid melting of the glass powder, and accordingly the high emittance pigment is rapidly covered by the molten glass powder, thereby restraining the oxidation of the high emittance pigment. However, even where the glass paste is thus rapidly heated, the high emittance pigment is gradually decomposed in the process of the firing operation, as shown in the schematic chart of the reaction process described in the above-identified patent. That is, the decomposition of the high emittance pigment is not satisfactorily restrained in the disclosed technique.

DISCLOSURE OF INVENTION

A further study by the present inventors with the purpose of producing a glass coating having higher emittance revealed that the reduction in the emissivity is due not only to the oxidation of the high emittance pigment, but also to the fact that the high emittance pigment is melt into the glass structure constituting the glass coating in the firing step. That is, the study of the present inventors revealed that such a reaction between the high emittance pigment and the glass structure is a cause for the reduction of the emissivity. Further, the reaction causes a change in the composition of the glass structure, resulting in a reduction in the heat resistance of the glass coating. As described above, the glass coating is provided on the surface of the refractory or other structural body for the purpose of increasing the emissivity of the structural body which is used at a high temperature. Namely, the glass coating is repeatedly or always exposed to a high temperature while the structural body is used. Accordingly, the glass coating suffers from the problematic reduction in the emissivity and the deterioration of the heat resistance due to the interface reaction between the glass structure and the high emittance pigment not only while the glass coating is produced but also while it is used, and moreover, independently of whether the pigment is of a non-oxide or an oxide.

The present invention was developed under the above-described background situation and has a first object of providing a high emittance glass coating material which is capable of suitably restraining the interface reaction between the glass structure and the high emittance pigment that is dispersed in the glass structure while the high emittance glass coating material is produced or while the high emittance glass coating is used. The present invention further has a second object of providing a high emittance glass coating, and a third object of providing a method of manufacturing the high emittance glass coating.

The above first object may be achieved by a first feature of the present invention, which provides a high emittance glass coating material which is applied to a surface of a specific structural body and fired on the surface, for providing on the surface a glass coating having a glass structure in which pigment particles having a predetermined degree of emissivity are dispersed, the high emittance glass coating material being characterized by including: (a) a pigment covering film having a predetermined thickness, which is provided to cover each of the pigment particles, and which includes silicon dioxide such that a content of the silicon dioxide in the pigment covering film is higher than a content of the silicon dioxide in each portion of the glass structure which is adjacent to a corresponding one of the pigment particles.

According to the first feature of the present invention, the high emittance glass coating material includes the pigment covering film having the predetermined thickness, which is provided to cover each of the pigment particles, and which includes the silicon dioxide such that the content of the silicon dioxide in the pigment covering film is higher than the content of the silicon dioxide in each portion of the glass structure which is adjacent to the corresponding one of the pigment particles. Thus, the glass coating which is obtained by firing the glass coating material applied to the surface of the structural body, is provided, at its interface between each pigment particle and the glass structure, with the pigment covering film which has a comparatively low reactivity with the pigment particle owing to its higher content of the silicon dioxide than that in the glass structure. The provision of the pigment covering film at the interface permits effective restraint of an interface reaction between the pigment particles and the glass structure while the glass coating material is fired or while the glass coating is used. That is, the interface reaction can be suitably restrained by increasing, at the interface between the pigment particle and the glass structure, the purity of the silicon dioxide which is chemically stable.

The above-indicated second object may be achieved by a second feature of the present invention, which provides a high emittance glass coating which is provided on a surface of a specific structural body and which has a glass structure in that pigment particles having a predetermined degree of emissivity are dispersed, the high emittance glass coating being characterized by including: (a) a pigment covering film having a predetermined thickness, which is provided to cover each of the pigment particles, and which includes silicon dioxide such that a content of the silicon dioxide in the pigment covering film is higher than a content of the silicon dioxide in each portion of the glass structure which is adjacent to a corresponding one of the pigment particles.

According to the second feature of the present invention, high emittance glass coating includes the pigment covering film having a predetermined thickness, which is provided to cover each of the pigment particles, and which includes silicon dioxide such that the content of the silicon dioxide in the pigment covering film is higher than the content of the silicon dioxide in each portion of the glass structure which is adjacent to the corresponding one of the pigment particles. Thus, the glass coating is provided, at its interface between each pigment particle and the glass structure, with the pigment covering film which has a comparatively low reactivity with the pigment particle owing to its higher content of the silicon dioxide than that in the glass structure. The provision of the pigment covering film at the interface permits effective restraint of an interface reaction between the pigment particles and the glass structure while the glass coating is used in the above-described first and second In the above-described first and second inventions, (b) the above-described glass structure is preferably a borosilicate glass which includes the silicon dioxide as its principal component and also boric acid such that the content of the silicon dioxide in the above-described each portion of the glass structure is approximately 80 (wt %). Since the borosilicate glass is a glass having a high heat resistance, it is possible to obtain a glass coating of the structure which is suitable for use where a further higher heat resistance and a further higher emissivity are required. As the above-described borosilicate glass, for example, it is preferable to use a reaction cured glass which is obtained by firing a high purity silica glass whose content of the silicon dioxide is about 96(%) and a boron oxide which has been added to the high purity silica glass such that a content of the boron oxide in the sum of the high purity silica glass and the boron oxide is several (%), or alternatively a borosilicate glass whose content of the silicon dioxide is approximately 81(%). In the former reaction cured glass which is produced from the high purity silica glass particles, the high purity silica glass particles and the boron oxide added to the high purity silica glass are fired so that boron penetrates into each of the high purity silica glass particles whereby a layer of the borosilicate is formed on the surface, leading to a reduction in the content of the silicon dioxide at the surface. Thus, the content of the silicon dioxide in each portion of the glass structure which is adjacent to the corresponding pigment particle would be as low as about 80(%), whatever glass is used as the borosilicate glass, possibly causing an interface reaction which reduces the optical properties of the pigment particles, without the provision of the pigment covering film or pigment covering layer. From the point of view of the heat resistance, it is desirable that the silicon dioxide purity of the borosilicate glass be maximized. To this end, it is desirable that the borosilicate glass contain a minimum amount of impurities, in particular, sodium (Na), potassium (K) and other alkaline metals, magnesium (Mg), calcium (Ca) and other alkaline earth metals, iron (Fe), titanium (Ti), and lead (Pb), which tend to reduce the heat resistance of the borosilicate glass. The content of the impurities in the borosilicate glass is preferably 1 (wt %) less.

Further, the content of the silicon dioxide in the pigment covering film or pigment covering layer is preferably at least 85 (wt %). In this arrangement, the interface reaction between the pigment particles and the glass structure is further restrained owing to the sufficiently high content of the silicon dioxide. Also where the glass structure is constituted by the above-described borosilicate glass, for example, the content of the silicon dioxide in the pigment covering film or pigment covering layer is sufficiently higher than the content of the silicon dioxide in the portions of the glass structure which are adjacent to the respective pigment particles.

Further, (a-2) the content of the silicon dioxide in the pigment covering film or pigment covering layer is preferably at least 99 (wt %). In this arrangement, the interface reaction between the pigment particles and the glass structure is further assuredly restrained owing to the extremely high content of the silicon dioxide.

Further, (a-3) an average thickness of the pigment covering film or pigment covering layer is preferably about 0.5 ($\mu$m). This average thickness of the pigment covering film or pigment covering layer is large enough to further assuredly restrain the interface reaction between the pigment particles and the glass structure, while at the same time this average thickness is small enough to avoid breakage of the pigment covering film or pigment covering layer due to a difference in coefficient of thermal expansion between the pigment covering film or pigment covering layer and the pigment particles during the formation of the pigment covering film or pigment covering layer, or to avoid a considerable influence on the thermal properties of the glass coating such as its softening point or thermal expansion coefficient. Thus, this average thickness avoids reduction in the optical properties of the pigment particles without particularly deteriorating the function of the glass coating.

Further, (a-4) a thickness of the pigment covering film or pigment covering layer preferably ranges from about 0.1 ($\mu$m) to several($\mu$m). This thickness of the pigment covering film or pigment covering layer is large enough to further assuredly restrain the interface reaction between the pigment particles and the glass structure, while this thickness is small enough to avoid breakage of the pigment covering film or pigment covering layer due to a difference in coefficient of thermal expansion between the pigment covering film or pigment covering layer and the pigment particles during the formation of the pigment covering film or pigment covering layer, or to avoid a considerable influence on the thermal properties of the glass coating such as its softening point or thermal expansion coefficient. Thus, this thickness range avoids reduction in the optical properties of the pigment particles without particularly deteriorating the function of the glass coating.

Further, (c) each of the above-described pigment particles is preferably constituted by at least one of boron silicide such as silicon tetraboride or silicon hexaboride, molybdenum disilicide, silicon carbide, iron oxide, silicon nitride, and chromium oxide, each of which has a sufficiently high emissivity, thereby making it possible to form a high emittance glass coating having a high emissivity. It is further preferable that the pigment particle be the boron silicide. The boron silicide is further preferably used as the pigment particle since the boron silicide has an extremely high emissivity. The boron silicide has also a high reactivity with the glass structure since the boron silicide is not an oxide, so that the provision of the pigment covering film or pigment covering layer is further considerably effective to this arrangement in which the pigment particle is constituted by the boron silicide. It is still further preferable that the pigment particle be the silicon tetraboride, thereby obtaining a glass coating which maintains its high emissivity at a further higher temperature, owing to the fact that the optical properties of the silicon tetraboride are less likely to be affected at a high temperature, than those of other boron silicide.

Further, (c-1) each of the above-described pigment particles is a silicon tetraboride in the form of particles whose average diameter is approximately 2 ($\mu$m). According to this arrangement, it is possible to sufficiently disperse the pigment particles in the glass structure, and also sufficiently increase the emissivity of the glass coating.

Further, (c-2) each of the above-described pigment particles is a silicon tetraboride in the form of particles whose diameters range from 1 to 10 ($\mu$m). According to this arrangement, it is possible to sufficiently disperse the pigment particles in the glass structure, and also sufficiently increase the emissivity of the glass coating.

The above-indicated third object may also be achieved by the present third invention of the present invention, which provides a method of manufacturing a high emittance glass coating which has a glass structure in that pigment particles having a predetermined degree of emissivity are dispersed, and which is provided on a surface of a specific structural body, the method including: (d) a paste preparation step of preparing a paste which includes the pigment particles and a specific glass powder (e) a paste coating step of applying the paste to the surface of the specific structural body, and (f) a heat treatment step of forming the glass structure from the glass powder by heating the paste which has been applied to the surface, the method being characterized by including (g) a pigment-particle covering step of providing on surface of each of the pigment particles a pigment covering film having a predetermined thickness, the pigment covering film including silicon dioxide such that a content of the silicon dioxide in the pigment covering film is higher than a content of the silicon dioxide in each portion of the glass structure which is adjacent to a corresponding one of the pigment particles, the pigment-particle covering step being implemented prior to the paste preparation step.

According to the present method of manufacturing the high emittance glass coating, the pigment-particle covering step is implemented prior to the paste preparation step, for providing on the surface of each of the pigment particles the pigment covering film which has a predetermined thickness, and which includes silicon dioxide such that the content of the silicon dioxide in the pigment covering film is higher than the content of the silicon dioxide in each portion of the glass structure adjacent to the corresponding one of the pigment particles. Therefore, the paste prepared in the paste preparation step includes the glass powder and the pigment particles each of which is provided at its surface with the pigment covering film having a low reactivity with the glass structure owing to the high content of the silicon dioxide in the pigment covering film. The presence of the pigment covering film is effective to restrain the interface reaction between the glass structure and the pigment particles while the prepared paste is subjected to the heat treatment in the heat treatment step. Similarly, also after the high emittance glass coating has been produced, namely, also while the high emittance glass coating is used, the interface reaction is restrained owing to the presence of the pigment covering film.

In the above-described third feature of the present invention, (g) the above-described pigment-particle covering step preferably includes: (g-1) an inorganic-high-molecular-film forming step of forming an inorganic high molecular film on the surface of the each of the pigment particles, the inorganic high molecular film being constituted by an inorganic high molecule which includes silicon; and (g-2) a heating and forming step of heating the each of the pigment particles having the inorganic high molecular film formed thereon, at a predetermined temperature in an oxidizing atmosphere, so that the pigment covering film having the content of the silicon dioxide is formed from the inorganic high molecular film. According to the present method, the inorganic high molecular film including the silicon is formed on the surface of each of the pigment particles in the inorganic-high-molecular-film forming step, and each of the pigment particles is then heated in the oxidizing atmosphere for forming the pigment covering film from the inorganic high molecular film in the heating and forming step. Thus, the pigment covering film takes the form of the inorganic high molecule to be formed on the surface of the pigment particles, thereby making it possible to preferably form the pigment covering film with a small and constant thickness. Further, since the inorganic high molecule includes the silicon, the formed pigment covering film has a predetermined content of the silicon dioxide as a result of oxidation of the silicon included in the inorganic high molecule by heating the pigment particles in the oxidizing atmosphere. The pigment covering film having the predetermined thickness and the predetermined content of the silicon dioxide can be thus preferably formed.

Further, (g-1) the inorganic-high-molecular-film forming step includes: (g-1-1) a pigment-particle dispersing step of dispersing the pigment particles in a liquid including the inorganic high molecule, for preparing a dispersion liquid; and (g-1-2) a spray-drying step of spray-drying the dispersion liquid, for forming the inorganic high molecular film on the surface of the each of the pigment particles. According to the present method, the pigment particles are dispersed in the liquid including the inorganic high molecule for preparing the dispersion liquid in the pigment-particle dispersing step, and the dispersion liquid including the inorganic high molecule and the pigment particles is spray-dried for forming the inorganic high molecular film on the surface of each of the pigment particles in the spray-drying step. The liquid including the inorganic high molecule which covers the pigment particle is rapidly spray-dried, for thereby forming the inorganic high molecular film with its thickness made further small and constant.

Further, (g-1-3) a compound substantially constituted by hydrogen (H), nitrogen (N) and silicon (Si) is preferably used as the inorganic high molecule in the inorganic-high-molecular-film forming step. According to the present method, the silicon and the oxygen are bonded to each other as a result of the firing of the compound in the oxidizing atmosphere, thereby forming the silicon dioxide so that the inorganic high molecular film is formed on the surface of each pigment particle, while the hydrogen and the nitrogen are bonded to each other as a result of the firing of the compound in the oxidizing atmosphere, thereby forming ammonia ($NH_3$) or gaseous hydrogen ($H_2$) in addition to the ammonia, each of which is extinguished immediately after the formation. Thus, the formed inorganic high molecular film and also the pigment covering film constituted by the inorganic high molecular film are permitted to include an extremely high content of the silicon dioxide, whereby the interface reaction between the pigment particles and the glass structure is further restrained. As the above-described compound, perhydropolysilazane is preferably used, and the compound may include a small amount of oxygen (O) or carbon (C) in addition to the above-described elements.

Further, (d-1) the pigment particles and the glass powder are preferably dispersed together with an organic binder in an organic solvent in the above-described paste preparation step. According to this method, the paste is prepared by dispersing the pigment particles and the glass powder in the organic solvent, thereby making it possible to form a further uniform glass coating. Further, the inclusion of the organic binder in the paste permits the paste to have a suitable thickness when the paste is applied to the surface of the above-described structural body. The amounts of the organic binder and organic solvent to be used are determined by taking account of the viscosity of the paste.

Further, (e-1) the paste is preferably sprayed on the above-described surface in the above-described paste application step. According to this method, it is possible to easily form a coating on the surface of the structural body with its thickness substantially constant. Further, (f-1) the paste is heated in a non-oxidizing atmosphere in the above-described heat treatment step. According to this method, the oxidation of the pigment particles is further restrained during the heat treatment in the absence of oxygen in the firing atmosphere. This further reduces the necessity of rapidly heating and cooling the paste for the purpose of preventing the oxidation, whereby the glass coating is formed by raising and lowering the temperature in accordance with a desired temperature curve which minimizes the distortion of the structural body, and accordingly making it possible to produce the structural body provided with the glass coating, with a high geometric accuracy.

Further, (d-2) a borosilicate glass which includes the silicon dioxide as its principal component and also includes boric acid is used as the above-described glass powder in the above-described paste preparation step. According to this method, since the borosilicate glass is a glass having a high heat resistance, it is possible to obtain a glass coating of the structure which is suitable for use where a further higher heat resistance and a further higher emissivity are required. As the borosilicate glass, the above-described reaction cured glass or borosilicate glass or other glass is preferably used. The borosilicate glass preferably has a maximum content of the silicon dioxide purity and a minimum content of impurities, such as sodium, potassium and other alkaline metals, magnesium, calcium and other alkaline earth metals, iron, titanium, and lead, which tend to reduce the heat resistance of the borosilicate glass. The content of the impurities in the borosilicate glass is preferably at least 1 (wt %).

BEST MODE FOR CARRYING OUT THE INVENTION

Figure 1:
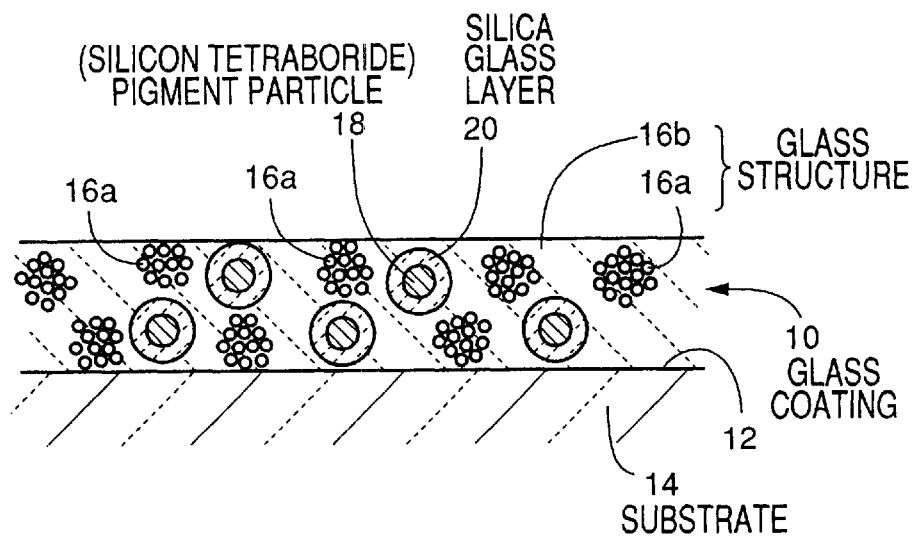
FIG. 1 is a view in cross section showing a substrate on which a glass coating of a first embodiment of the present invention is formed.

Some embodiments of the present invention will be explained in detail referring to the drawings. It is noted that elements which will be described are not necessarily accurately illustrated in the drawings, particularly in their relative dimensions.

FIG. 1 is a view in cross section schematically showing a substrate 14 which is provided on its surface 12 with a glass coating 10 according to one embodiment of the present invention. The substrate 14 is used, for example, as a heat insulator for a firing furnace, and is a refractory which is constituted by an alumina or mullite or inorganic fibrous light-weight refractory having a thermal expansion coefficient ranging approximately from $2.0 \times 10^{-6}$ to $4.0 \times 10^{-6}$ (/° C.), for example. This inorganic fibrous light-weight refractory, which is disclosed in the above-identified U.S. patent, is a composite including a major component in the form of an inorganic fiber such as silica ($SiO_2$), and a binder phase such as borosilicate, aluminoborosilicate or aluminosilicate, for example. For instance, this inorganic fibrous light-weight refractory has the following physical properties: porosity of about 90(%) or more; specific gravity of about 0.20 or less; thermal conductivity of about 0.06 (W/m·k) or less; and bending strength of about 7–20 (kgf/$cm^2$). The surface 12 of the substrate 14 is maintained as it was when the substrate 14 was produced with a firing treatment, and has not been subjected to a grinding, etching or other treatment. In the present embodiment, the substrate 14 corresponds to a structural body.

The glass coating 10 has a thickness of about 0.3–0.5 (mm), for example, and is constituted by a glass structure 16 and pigment particles 18. The pigment particles 18 are dispersed into the glass structure 16 so as to be distributed substantially evenly within the glass structure 16. The glass structure 16 is a reaction cured glass which is disclosed in the above-identified U.S. patent, for example, and which is entirely constituted by a borosilicate glass and has a thermal expansion coefficient of approximately $2.0 \times 10^{-6}$ (/° C.), for example, as described below with respect to its method of production. The glass structure 16 consists of a porous portion 16a which is constituted by a borosilicate glass including a high purity silica glass having a purity of approximately 96 (wt %) described below and which constitutes a nucleus of the glass structure 16, and a dense portion 16b which is formed from the high purity silica glass and boron oxide and which has a silica content of about 82 (wt %).

Each of the pigment particles 18 is, for example, silicon tetraboride whose average diameter is about 2 ($\mu$m). The glass coating 10 includes the pigment particles 18 such that a content of the pigment particles 18 is about 2.5 (wt %) for the entirety of the glass coating 10, for example. Each of the pigment particles 18 is surrounded by a silica glass layer 20 whose thickness ranges from 0.1 ($\mu$m) to several ($\mu$m), for example. Namely, the silica glass layer 20 is provided at the interface between the glass structure 16 and each of the pigment particles 18. This silica glass layer 20 is constituted by a high purity silica glass having a purity of about 99(%), for example. In the present embodiment, the silica glass layer 20 corresponds to a pigment covering layer. That is, the silica content in the silica glass layer 20, i.e., in the pigment covering layer is higher than that in the dense portion 16b which is located in the vicinity of the interface between the pigment particles 18 and the glass structure 16. Therefore, an interface reaction between the pigment particles 18 and the glass structure 16 is restrained owing to the presence of the silica glass layer 20, so that the glass coating 10 has a high emissivity of 0.8 or more at a high temperature of about 1400(° C.), for example, as below by reference to FIG. 6. Further, the silica glass layer 20 has a purity of the silicon dioxide which is much higher than that in the glass structure 16, so that the silica glass layer 20 is not melted even at a high temperature at which the glass coating 10 is likely to be softened, maintaining its function of protecting the pigment particle 18.

Figure 2:
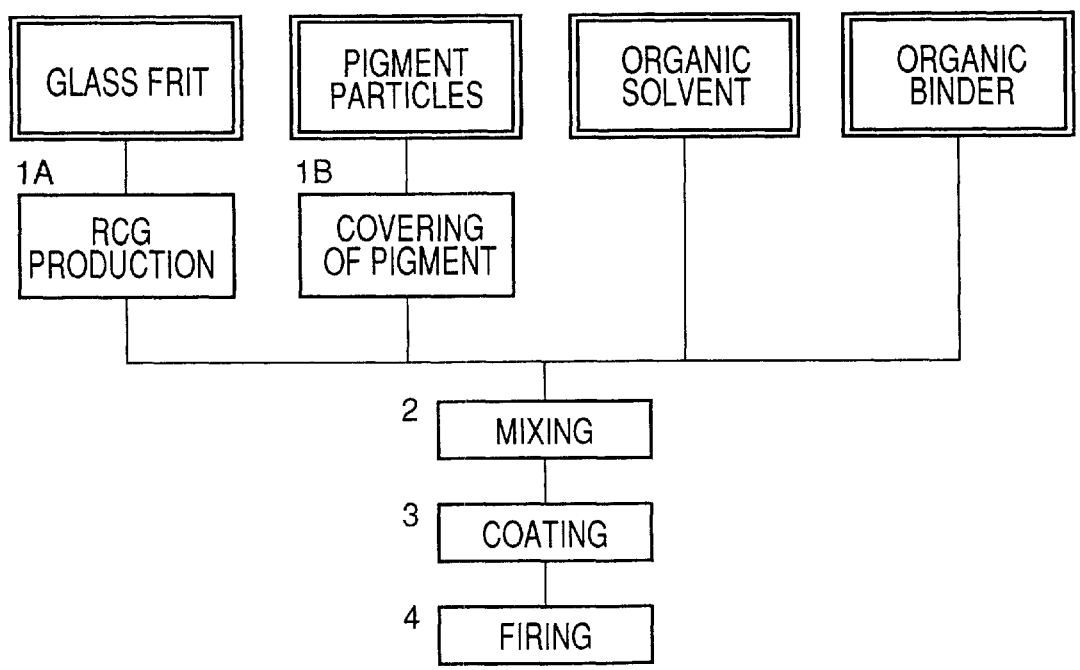
FIG. 2 is a flow chart explaining steps of producing the glass coating of FIG. 1.

The glass coating 10 constructed as described above is produced, for example, in accordance with the flow chart of FIG. 2. The manufacturing method will be explained according to the drawings.

Figure 3:
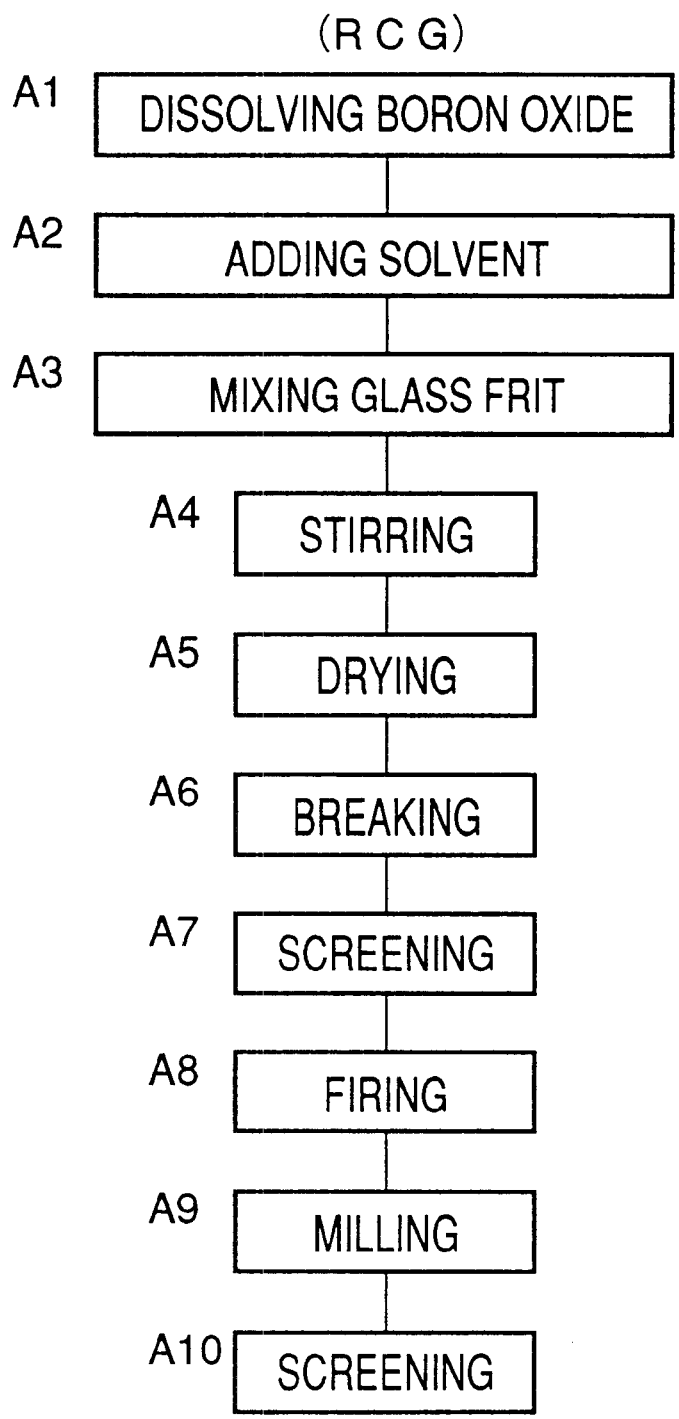
FIG. 3 is a flow chart explaining a RCG producing step in the flow chart of FIG. 2.

A RCG producing step of step 1A is first implemented to produce a reaction cured glass material powder from a glass frit. The RCG producing step is shown in detail in FIG. 3, for example. In a boron-oxide dissolving step of step A1, 37 (g) of boron oxide powder having a purity of 5N (99.999% or more) is dissolved in 272 (cc) of ion-exchanged water which has been heated up to about 85(° C.), for preparing an aqueous solution of boron oxide. A solvent adding step of step A2 is then implemented to add 137 (g) of ethanol (preferably special grade reagent), for example, into the aqueous solution of boron oxide. Step A2 is followed by a glass frit mixing step of step A3 in which 400 (g) of high purity silica glass frit is further added into the aqueous solution, thereby preparing a slurry. Therefore, in the present embodiment, the amount of the boron oxide powder to be added is about 8.5 (wt %). It is preferable to use as the high purity silica glass, for example, a porous binary system glass which is composed by 96% of $SiO_2$, 3% of $B_2O_3$ and 0.4% of $Al_2O_3$ and which has the following physical properties; specific surface of about 200 (m²/g); and porosity of about 28(%). Step A3 is followed by a stirring step of step A4 in which this mixture is stirred while being held at about 80(° C.), for example, by a hot plate, so that the ethanol and aqueous component are removed from the slurry.

In step A4, the ethanol and aqueous component are removed from the slurry whereby the viscosity of the slurry is increased to such an extent that the slurry becomes difficult to be stirred. Step A4 is followed by a drying step of step A5 in which the slurry is put in an oven, for example, and is further dried at a temperature of about 70(° C.) in the oven, so that the ethanol and aqueous component still remaining in the slurry are removed from the slurry. After the slurry has been thus dried, the dried slurry is broken by hand in a breaking step of step A6. Step A6 is followed by a screening step of step A7 in which large particles each having a size of about 1 (mm) or more, for example, are removed by screening with the use of a sieve of about #16. In a firing step of step A8, the dried slurry which has been broken and screened is put in a silica-made vessel having a purity of about 63(%), and is fired, for example, for about 2 (hr) at temperatures from about 1000 to 1100(° C.), whereby the high purity silica glass frit and the silicon oxide react with each other. In a milling step of step A9, the glass frit which takes the form of a mass as a result of the firing, is milled by a pot type ball mill or other device. Finally, in a screening step of step A10, large particles each having a size of about 45 ($\mu$m) or more, for example, are removed by screening with the use of a sieve of about #330–300, whereby the reaction cured glass material powder is obtained.

In a pigment covering step of step 1B of FIG. 2, each of the pigment particles 18 which is constituted by the above-described silicon tetraboride is covered by the high purity silica glass. This pigment covering step is shown in detail in FIG. 4. An inorganic-high-molecule diluting step of step B1 is first implemented to dilute perhydropolysilazane which is a pre-ceramic polymer (inorganic high molecule which is heat-treated into ceramics), with a solvent such as xylene, such that the dilution has a concentration of perhydropolysilazane of about 10 (wt %). The perhydropolysilazane is constituted by silicon, nitrogen and hydrogen, and is a hyaline liquid having a structure as shown in FIG. 5, a molecular weight of about 600–900 and a density of about 1.3 (g/cm³). The perhydropolysilazane includes no more than several ($\mu$m) of impurity and accordingly has an extremely high purity. In a pigment-particle dispersing step of step B2, the pigment particles 18 in the form of the silicon tetraboride particles whose purity is 98(%) or more are blended in the inorganic high molecule dilution, such that a content of the silicon tetraboride particles in the dilution is about 10–20 (wt %), and the blended dilution is stirred for about 30 minutes by a vibrating mill or other device thereby preparing a dispersion liquid in which the pigment particles 18 are dispersed. Step B2 is followed by a spray-drying step of step B3 for hot-air drying the dispersion liquid by a spray dryer or other device, under a spray-drying condition in which the hot air inlet temperature and outlet temperature are set to be about 110 (° C.) and 70 (° C.), respectively, so that the inorganic high molecule dilution adhering to the surface of each of the pigment particles 18 is dried and condensed, resulting in the formation of an inorganic high molecular film on the surface. In a heat treatment step of step B4, the formed inorganic high molecular film is subjected to a heat treatment in the atmosphere at about 400(° C.), for example. As a result of the heat treatment, the silicon in the inorganic high molecular film and the oxygen in the atmosphere are bonded to each other thereby forming the silicon dioxide (silica), while the nitrogen and the hydrogen in the inorganic high molecular film are bonded to each other, thereby forming ammonia ($NH_3$), which is extinguished immediately after the formation. Consequently, the silica glass coating having an extremely high purity which is formed on the surface of each of the pigment particles 18, with its thickness of about 0.1 ($\mu$m) to several ($\mu$m), for example. The inorganic high molecular film which is formed in the spray-drying step does not have a constant thickness on the surface of each of the pigment particles 18, and accordingly the silica glass coating which is formed after the heat treatment also does not have a constant thickness. However, the thickness variation of the silica glass coating is at least held within the above-described range, and the average of the thickness is about 0.5 ($\mu$m). In the present embodiment, steps B1–B3 correspond to an inorganic-high-molecular-film forming step, step B4 corresponds to a heating and forming step (B4), and the silica glass film corresponds to a pigment covering film.

In a mixing step of step 2 of FIG. 2, about 234 (g), for example, of the reaction cured glass material powder which is prepared as described above, about 6.0 (g), for example, of the pigment particles 18 each of which is provided with the silica glass film, about 386 (g) of an organic solvent such as ethanol, and about 39.2 (g) of an organic binder such as 2% methylcellulose aqueous solution are put together with an alumina boulder into an alumina porcelain pot, which is then closed, and rotated on a rotary table for about 5 hours, for example, so that the materials in the pot are mixed. The thus obtained mixture is a paste (slurry) in which the reaction cured glass material powder and the pigment particles 18 are dispersed. The ethanol functions as a dispersing agent, while the methylcellulose functions as a shape maintaining agent which permits the coated film to have a suitable thickness in the subsequent coating step. The amounts of the ethanol and methylcellulose to be added are suitably determined by taking account of the viscosity of the paste obtained by mixing. The subsequent spray coating step of step 3 is implemented to fill a spray gun with the paste discharged from the pot, and then spray the paste onto the surface 12 of the substrate 14. In this instance, the discharge pressure of the spray gun is adjusted to be about 3 ($kgf/cm^2$) or less, for example. The substrate 14 having the paste applied to the surface 12 is left at a room temperature for a predetermined time, and is then dried in an oven at a temperature of about 70(° C.), for example, for removing the organic solvent from the substrate 14. In the subsequent firing step of step 4, the substrate 14 is subjected to a heat treatment at a temperature of about 1250(° C.) for about 1.5 (hr), in an atmospheric furnace into which a nitrogen gas is supplied, for example, whereby the above-described glass coating 10 is formed from the coated film. The temperature rising rate in the firing step is about 200(° C./hr), for example. Accordingly, in the glass structure 16 which constitutes the glass coating 10, the pigment particles (silicon tetraboride) 18 are included while being covered by the respective silica glass films, each of which constitutes the above-described silica glass layer 20. In the present embodiment, the above-described paste corresponds to the high emittance glass coating material, while the mixing step and the firing step correspond to the paste preparation step and the heat treatment step, respectively.

In the present embodiment, the pigment particles 18 are provided with the respective silica glass films (i.e., the silica glass layers 20) on their surfaces, when the pigment particles 18 are mixed with the reaction cured glass material powder and then fired on the substrate 14. During the firing, the presence of the silica glass films serves to restrain the pigment particles 18 from reacting with the glass structure 16 formed from the reaction cured glass material powder. Therefore, the composition of the glass structure 16 is restrained from being changed, while the pigment particles 18 are restrained from dissolving into the glass structure 16, for thereby preferably restraining reduction in the amount of the pigment particles 18 which contributes to the emissivity, so that the glass coating 10 having the high heat resistance and the high emittance is obtained.

Figure 6:
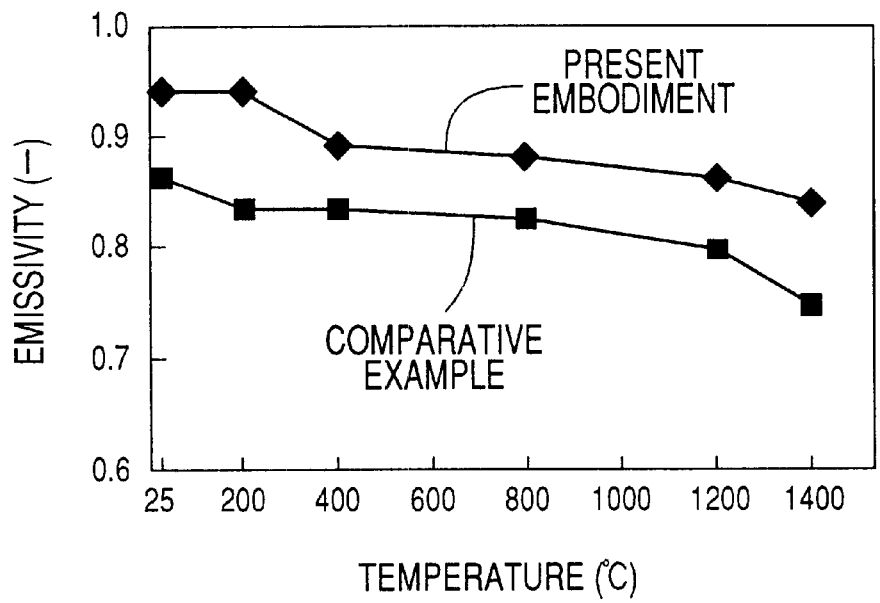
FIG. 6 is a view showing temperature dependency of an emissivity of the glass coating of FIG. 1, as compared with that of the conventional glass coating.

FIG. 6 is a view showing a temperature dependency of the emissivity of the glass coating 10 of the present embodiment which is produced as described above, as compared with that of the conventional glass coating (comparative example) which is fired on the substrate, with the reaction cured glass material powder mixed with the pigment particles 18 each of which is not provided on its surface with any film. It is noted that the glass coating of the comparative example has been produced in the same manner as the present embodiment, except for the absence of the silica glass film on the surface of each pigment particle. As is clear from the figure, the glass coating 10 of the present embodiment exhibits an extremely high emissivity of about 0.95 at a room temperature (about 25° C.) and keeps the emissivity as high as about 0.85 even at a high temperature of about 1400(° C.). On the other hand, the emissivity of the comparative example is as low as 0.9 or less at the room temperature and is further lowered to about 0.75 at the temperature of 1400(° C.). That is, the glass coating 10 according to the present embodiment can be not only given an emissivity higher than that of the conventional coating immediately after the firing operation, but also can keep the emissivity high while the glass coating is used at a high temperature with a small amount of reduction in the emissivity, i.e., a small difference between the value of the emissivity at the room temperature and the value of the emissivity during the service at the higher temperature. It is noted that the emissivity was measured by a well-known FT-IR emission spectrum measurement, in the temperature range between the room temperature and 800(° C.). At 1200 and 1400(° C.), the emissivity was measured as a radiant emittance relative to that of a black body, which radiant emittance is obtained by an injection-type emissivity measuring device on the basis of a ratio between the temperature indicated by a thermo-couple and the temperature indicated by a radiation thermometer. Further, the highest temperature of use of the glass coating 10 of the present embodiment and that of the comparative example were also measured. According to the measurement, the highest temperature of use of the comparative example was about 1270(° C.), while that of the glass coating 10 of the present embodiment was about 1350(° C.). Thus a considerable improvement in the heat resistance of the present embodiment was confirmed. The term "highest temperature of use" is interrupted to mean a maximum temperature at which the glass coating can be maintained for 24 (hr) without melting of the glass coating and deterioration in the optical properties (i.e., reduction in the emissivity).

Tables 1 and 2 given below show results of evaluation with respect to the durability of the glass coating 10 formed on the substrate 14 as shown in FIG. 1 [which is the heat insulator for the firing furnace whose coefficient of thermal expansion is about $2.0 \times 10^{-6}$ ($/° C.$)], as compared with that of the above comparative example.

Figure 7:
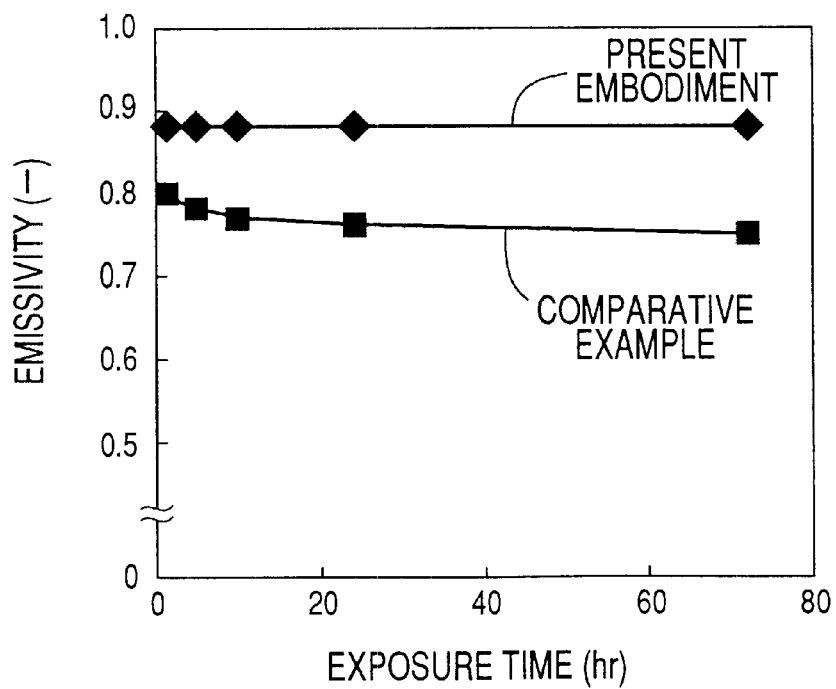
FIG. 7 is a view showing a result of an exposure test for evaluating durability of the emissivity of the glass coating of FIG. 1, as compared with that of the conventional glass coating.
Figure 8:
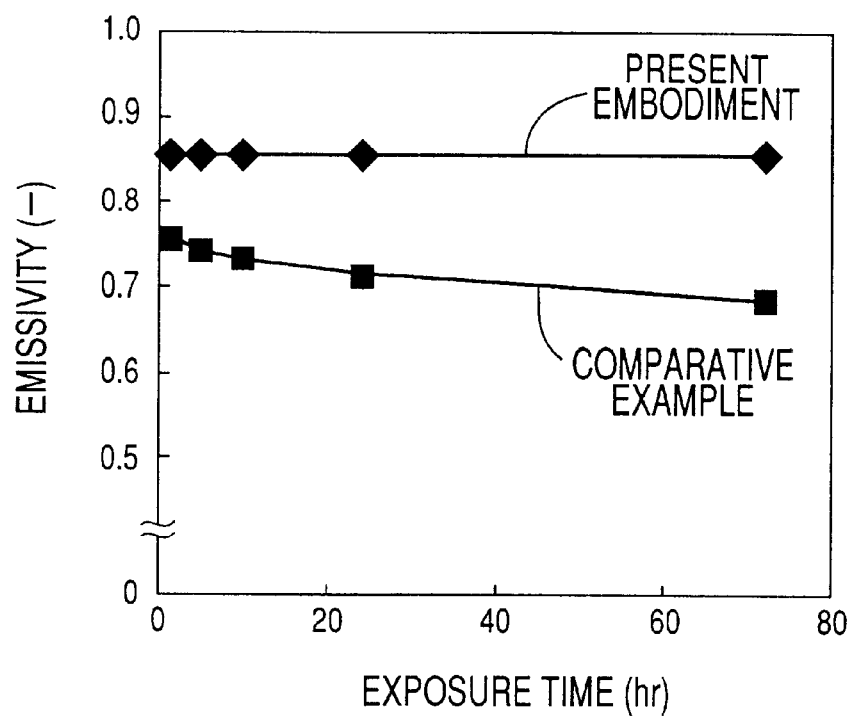
FIG. 8 is a view showing a result of an exposure test for evaluating the durability of the emissivity of the glass coating of FIG. 1 at different temperatures, as compared with that of the conventional glass coating.

FIGS. 7 and 8 are views in which the tables 1 and 2 are respectively graphed. The durability was evaluated after exposure tests conducted in the atmosphere at 1200(° C.) as shown in the table 1 and at 1400(° C.) as shown in the table 2. The evaluation was made by measuring the emissivity at the same temperatures as in the exposure tests, by the above-described injection-type emissivity measuring device. The temperature rising rate in each of the exposure tests was about 10(° C./min). The atmospheric temperature was first raised to the predetermined value, and the measurement of the emissivity of each sample of the glass coating was repeatedly effected when the cumulative exposure time amounted to 1, 5, 10, 24 and 72 (hr). Each value presented in the tables 1 and 2 is an average value of the measurements of three samples of the present embodiment, and those of three samples of the comparative examples.

TABLE 1

Emissivity after Exposure Test in Atmosphere of 1200 (° C.)

| Exposure Time | Present Embodiment | Comparative Example |
|---|---|---|
| 1 | 0.88 | 0.80 |
| 5 | 0.88 | 0.78 |
| 10 | 0.88 | 0.77 |
| 24 | 0.88 | 0.76 |
| 72 | 0.88 | 0.75 |

TABLE 2

Emissivity after Exposure Test in Atmosphere of 1400 (° C.)

| Exposure Time | Present Embodiment | Comparative Example |
|---|---|---|
| 1 | 0.85 | 0.75 |
| 5 | 0.85 | 0.74 |
| 10 | 0.85 | 0.73 |
| 24 | 0.85 | 0.71 |
| 72 | 0.85 | 0.68 |

As is apparent from the above tables 1, 2 and FIGS. 7, 8, the glass coating 10 of the present embodiment does not suffer from a reduction in its emissivity in the exposure test at all, and keeps the emissivity after the exposure test of 72 (hr) at the value before the exposure test. In the glass coating of the comparative example in which the silica glass layer 20 is not provided on the surface of each pigment particle 18, on the other hand, it is clear that the emissivity tends to be decreased with the time of exposure to the test temperature of either 1200(° C.) or 1400(° C.). That is, according to the glass coating 10 of the present embodiment, the interface reaction between the pigment particles 18 and the glass structure (glass matrix) 16 is restrained by covering each of the pigment particles 18 having the high emissivity with the high purity silica glass layer 20, and the pigment particles 18 are accordingly restrained from being deteriorated. It is considered that the emissivity is not reduced owing to the restraint of the deterioration of the pigment particles 18.

In short, in the present embodiment, the glass paste is constituted so as to include the silica glass film (silica glass layer 20) having a predetermined thickness, which is provided to cover each of the pigment particles 18, and which includes silicon dioxide such that a content of the silicon dioxide in the pigment covering film is higher than a content of the silicon dioxide in each portion of the glass structure which is adjacent to the corresponding pigment particle. Thus, the glass coating 10 which is obtained by firing the glass paste applied to the surface 12 of the substrate 14, is provided, at an interface between each of the pigment particles 18 and the glass structure 16, with the silica glass film (silica glass layer 20) which has a comparatively low reactivity with the pigment particle 18, owing to the higher content of the silicon dioxide in the silica glass film per se than in the glass structure 16. The provision of the silica glass film at the interface permits effective restraint of an interface reaction between the pigment particles and the glass structure while the glass paste is fired or while the glass coating 10 is used.

Further, in the present embodiment, the glass coating 10 is constituted so as to include the silica glass layer 20 having a predetermined thickness, which is provided to cover each of the pigment particles 18, and which includes silicon dioxide such that a content of the silicon dioxide in the silica glass layer 20 is higher than a content of the silicon dioxide in each portion of the glass structure 16 which is adjacent to the corresponding pigment particle 18. Thus, the glass coating 10 is provided, at an interface between each of the pigment particles 18 and the glass structure 16, with the silica glass layer 20 which has a comparatively low reactivity with the pigment particle 18, owing to the higher content of the silicon dioxide in the silica glass layer 20 per se than in the glass structure 16. The provision of the silica glass layer 20 at the interface permits effective restraint of an interface reaction between the pigment particles 18 and the glass structure 16 while the glass coating 10 is used.

Further, in the present embodiment, the content of the silicon dioxide in the silica glass layer 20 (silica glass film) is at least 99 (wt %). Thus, the interface reaction between the pigment particles 18 and the glass structure 16 is further restrained owing to the sufficiently high content of the silicon dioxide in the silica glass layer 20.

Further, according to the present embodiment, the silicon tetraboride is preferably used so as to increase the A10 emissivity of the glass coating 10, since the silicon tetraboride has an extremely high emissivity. The silicon tetraboride has also a high reactivity with the glass structure 16 because the silicon tetraboride is not an oxide, so that the provision of the silica glass film (silica glass layer 20) is considerably effective to this arrangement in which the pigment particle 18 is constituted by the silicon tetraboride. Further, the silicon tetraboride is advantageous in that the emissivity of the silicon tetraboride is less likely to be reduced at a high temperature than that of silicon hexaboride which is also one kind of the boron silicide. It has been confirmed that the emissivity of the glass coating at a temperature of 800(° C.) or higher where the silicon hexaboride is employed to form the pigment particles is lower than that of the glass coating 10 in which the silicon tetraboride is employed to form the pigment particles 18, by approximately 5–10(%).

Further, in the present embodiment, the thickness of the above-described silica glass film (silica glass layer 20) ranges approximately from 0.1 ($\mu$m) to several ($\mu$m). The thickness of the silica glass film (silica glass layer 20) is thus made sufficiently large to such an extent that the thermal properties of the glass coating 10 such as the highest temperature of use and thermal expansion coefficient are not considerably affected, so that the interface reaction between the pigment particles 18 and the glass structure 16 is further assuredly restrained.

Further, in the present embodiment, the glass coating 10 is produced such that prior to the implementation of the mixing step of step 2, the pigment-particle covering step of step 1B is implemented to provide the surface of each of the pigment particles 18 with the silica glass film (silica glass layer 20) which has a predetermined thickness and which includes the silicon dioxide such that the content of the silicon dioxide in the silica glass film per se is higher than the content of the silicon dioxide in each portion of the glass structure 16 which is adjacent to the corresponding pigment particle 18. Therefore, the paste prepared in the mixing step includes the glass powder and the pigment particles 18 each of which is provided at its surface with the silica glass film (silica glass layer 20) having a low reactivity with the glass structure 16 owing to the high content of the silicon dioxide in the silica glass film per se. The presence of the silica glass film (silica glass layer 20) is effective to restrain the interface reaction between the glass structure 16 and the pigment particles 18 while the prepared paste is subjected to the heat treatment in the heat treatment step of step 4. Similarly, also after the glass coating 10 has been produced, namely, also while the glass coating 10 is used, the interface reaction is restrained owing to the presence of the silica glass film (silica glass layer 20).

Further, in the present embodiment, the above-described pigment covering step includes an inorganic-high-molecular-film forming step of steps B1–B3 which are implemented to form the inorganic high molecular film constituted by the inorganic high molecule including the silicon, on the surface of each of the pigment particles 18, and the heat treatment step of step B4 which is implemented to heat each of the pigment particles 18 having the inorganic high molecular film formed thereon, at a predetermined temperature in an oxidizing atmosphere, so that the silica glass film (silica glass layer 20) having the silicon dioxide content of about 99 (wt %) is formed from the inorganic high molecular film. Thus, the inorganic high molecular film including the silicon is formed on the surface of each of the pigment particles 18 in the high-molecular-film forming steps, and the above-described silica glass film (silica glass layer 20) is formed from the inorganic high molecular film by the heat treatment in the oxidizing atmosphere in the heat treatment step. The silica glass film takes the form of the inorganic high molecule to be formed on the surface of each pigment particle 18, thereby making it possible to preferably form the film having a small and constant thickness. Further, since the inorganic high molecule includes the silicon, the formed silica glass film (silica glass layer 20) has the predetermined content of the silicon dioxide as a result of oxidation of the silicon included in the inorganic high molecule by the heat treatment in the oxidizing atmosphere. The silica glass film (silica glass layer 20) having the predetermined thickness and the predetermined content of the silicon dioxide can be thus suitably formed.

Further, in the present embodiment, the above-described inorganic-high-molecular-film forming step includes the high-molecule dispersing step of step B2 which is implemented to disperse the pigment particles 18 in the liquid including the inorganic high molecule, for preparing the dispersion liquid, and the spray-drying step of step B3 which is implemented to spray-dry the dispersion liquid, for forming the inorganic high molecular film. Thus, the dispersion liquid including the inorganic high molecule and the pigment particles 18 is spray-dried for forming the inorganic high molecular film on the surface of each of the pigment particles 18. Since the liquid including the inorganic high molecule which covers the pigment particle 18 is rapidly dried by spray-drying for forming the inorganic high molecular film, it is possible to form the inorganic high molecular film with its thickness made further small and constant.

Further, in the present embodiment, the above-described inorganic high molecule is the perhydropolysilazane consisting of the hydrogen, nitrogen and silicon. Thus, the silicon and the oxygen are bonded to each other as a result of firing of the perhydropolysilazane in the oxidizing atmosphere, thereby forming the silicon dioxide so that the inorganic high molecular film is formed on the surface of each pigment particle 18, while the hydrogen and the nitrogen are bonded to each other as a result of firing of the compound in the oxidizing atmosphere, thereby forming ammonia which is extinguished immediately after the formation. Thus, the formed inorganic high molecular film and also the silica glass film (silica glass layer 20) formed from the inorganic high molecular film are permitted to contain an extremely large content of silicon dioxide, whereby the interface reaction between the pigment particles 18 and the glass structure 16 is further restrained.

Further, in the present embodiment, the firing step of step 4 is implemented to effect the heat treatment in a non-oxidizing atmosphere. Thus, the oxidation of the pigment particles 18 is further restrained in the absence of oxygen in the firing atmosphere.

Further, in the present embodiment, the glass structure 16 is a borosilicate glass which includes the silicon dioxide as its principal component and also the boric acid. Since the borosilicate glass is a glass having a high degree of heat resistance, it is possible to obtain the glass coating 10 of the substrate 14 which is suitable for the use where a further higher heat resistance and a further higher emissivity are required.

A second embodiment of the present invention will be described. In the second embodiment, description of the elements which are identical to those of the above-described first embodiment will not be provided.

While the glass coating 10 in the above-described embodiment is provided on the substrate 14 which is constituted by a refractory, it is also possible to provide a metallic body with a glass coating similar to the glass coating 10. In such a case, it is necessary to select a material for constituting the glass structure 16 such that the selected material has a thermal expansion coefficient which matches that of the metallic body. As a specific example of the combination, there will be explained the glass coating provided on a Cr-Ni-Fe heat resistant alloy which is used for an engine part or other application. Since this Cr-Ni-Fe heat resistant alloy has a thermal expansion coefficient of about $10 \times 10^{-6}$ (/° C.), a $MgO-B_2O_3-SiO_2$ glass whose thermal expansion coefficient is $12 \times 10^{-6}$ (/° C.) was selected as the material (glass frit) of the glass structure 16. Further, a silicon carbide powder having a purity of 99.9(%) or higher and a particle diameter of 0.3–0.5 ($\mu$m) was employed as the high emittance pigment (pigment particle 18). There will be explained a process of producing the glass coating by using these materials. Since the present process is substantially identical with that in the embodiment shown in FIGS. 1–8, only the difference from the embodiment of FIGS. 1–8 will be described.

Figure 4:
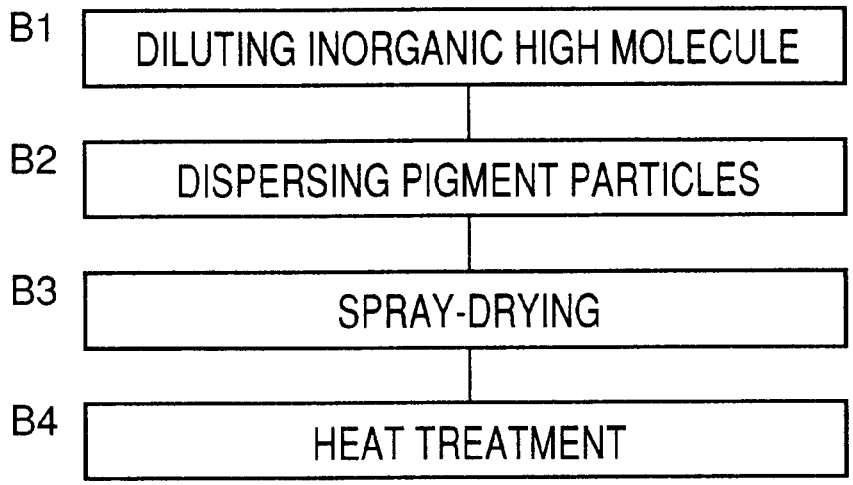
FIG. 4 is a flow chart explaining a pigment covering step in the flow chart of FIG. 2.
Figure 5:
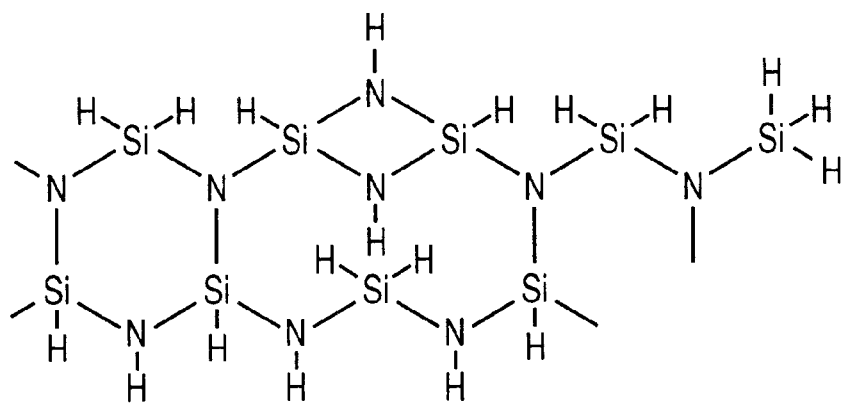
FIG. 5 is a view explaining a construction of an inorganic high molecule.

In the present embodiment, the silicon carbide powder having the silica glass layer formed on its surface is produced in accordance with steps similar to those of FIG. 4. In the mixing step of step 2 of FIG. 2, about 234 (g), for example, of the $MgO-B_2O_3-SiO_2$ glass powder which has been separately prepared, about 1.2 (g), for example, of the covered silicon carbide powder, about 386 (g), for example, of the ethanol, and about 39.2 (g), for example, of the 2% methylcellulose aqueous solution are put into the alumina porcelain pot, so as to be mixed with each other, as in the above-described first embodiment. A paste film is then formed on the Cr-Ni-Fe heat resistant alloy, as in the above-described first embodiment, and the paste film is fired on the heat resistant alloy to form a glass coating similar to the glass coating 10. In this case, the paste film is fired in a nitrogen atmosphere, for example, at a temperature of about 1050(° C.) for about 20 (min).

Figure 9:
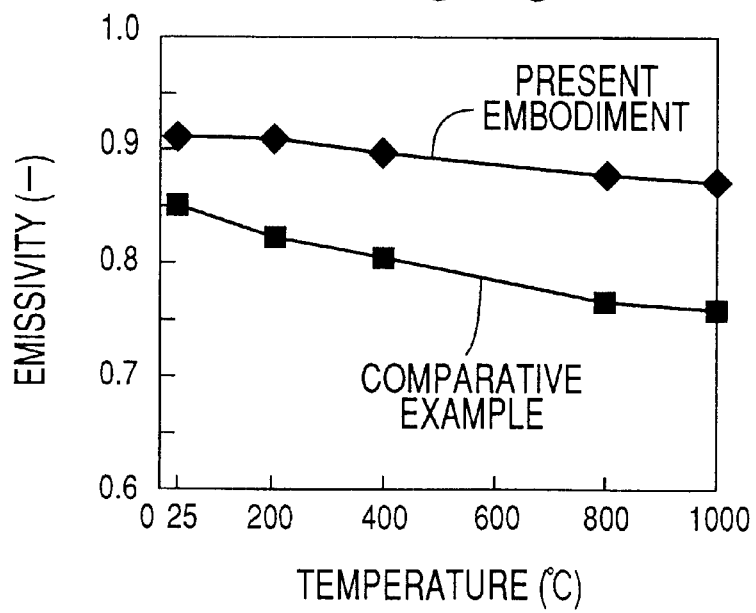
FIG. 9 is a view showing temperature dependency of emissivity of the glass coating of a second embodiment of the present invention, as compared with that of the conventional glass coating.

FIG. 9 is a view showing a temperature dependency of an emissivity of the glass coating which has been formed as described above, as compared with that of the conventional glass coating (comparative example) which is constituted by the silicon carbide powder not provided with the silica glass film. The method of measuring the emissivity is the same as described above. As is apparent from the figure, the glass coating of the present second embodiment exhibits a high emissivity of 0.9 or higher at the room temperature and keeps the emissivity as high as 0.85 or higher even at a high temperature of 1000(° C.), and exhibits an accordingly low temperature dependency of the emissivity. On the other hand, the emissivity of the comparative example is about 0.85 at the room temperature and is considerably lowered to about 0.75 at 1000(° C.). Further, in the exposure test in which each glass coating is exposed to the atmosphere for 24 hours, the comparative example in which the silicon carbide powder is not covered by the silica glass film has not shown an apparent change due to melting of the glass until the temperature has been increased to about 950(° C.). However, the melting of the glass was observed when the temperature was held at 1000(° C.), and the emissivity was decreased to 0.6 or lower after the test. In the glass coating of the present second embodiment in which the silicon carbide powder is provided with the silica glass film, the melting of the glass and the reduction in the emissivity were not detected even when the temperature was held at 1000(° C.).

Therefore, also in the present second embodiment, it is clear that the provision of the silica glass film for the silicon carbide powder serving as the pigment particle is effective to improve the emissivity and the heat resistance of the glass coating. That is, the present invention is applicable not only to the glass coating to be formed on the refractory, but also to the glass coating to be formed on the surface of the metallic body.

Figure 10:
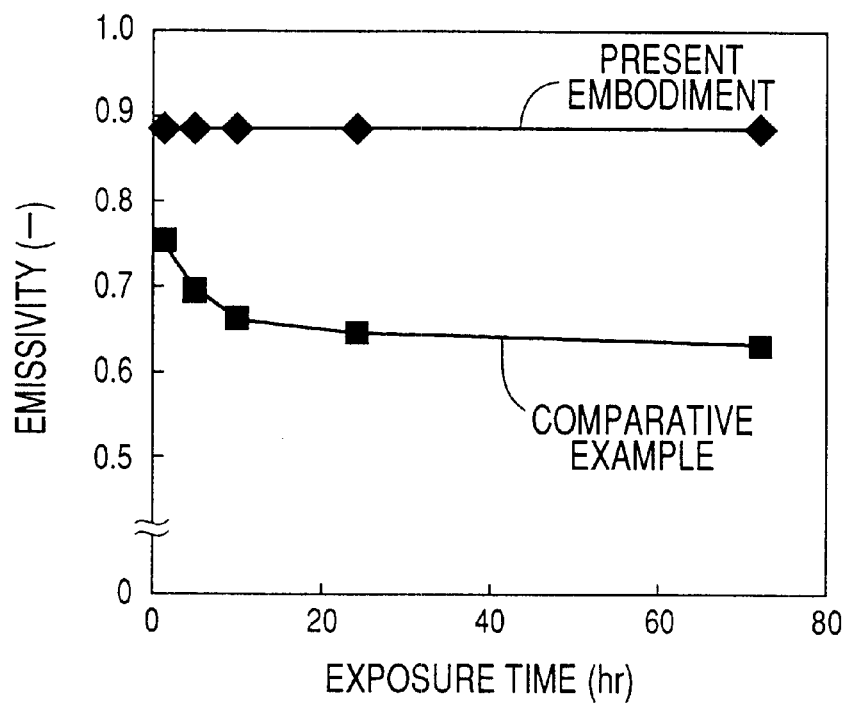
FIG. 10 is a view showing a result of an exposure test for evaluating durability of the emissivity of the glass coating of FIG. 9, as compared with that of the conventional glass coating.
Figure 11:
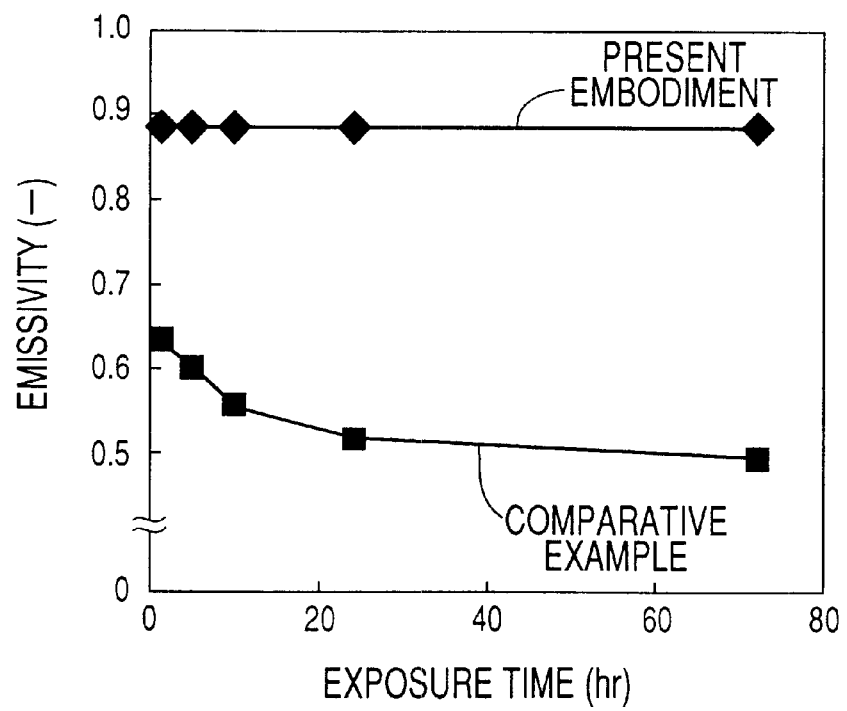
FIG. 11 is a view showing a result of an exposure test for evaluating the durability of the emissivity of the glass coating of FIG. 9 at different temperatures, as compared with that of the conventional glass coating.

The tables 3 and 4 given below show results of evaluation made with respect to the durability of the glass coating in which the silicon carbide powder is used as the pigment particle, as in the above-described evaluation made with respect to the durability of the glass coating in which the silicon tetraboride is used as the pigment particle. The results of the evaluation of the present glass coating are shown together with those of the comparative example. FIGS. 10 and 11 are views in which the tables 3 and 4 are respectively graphed. The durability test was made in the same manner as in the test of the tables 1 and 2, except that the test temperature in the table 3 is 800(° C.) while that in the table 4 is 1000(° C.).

TABLE 3

Emissivity after Exposure Test in Atmosphere of 800 (° C.)

| Exposure Time | Present Embodiment | Comparative Example |
| --- | --- | --- |
| 1 | 0.89 | 0.75 |
| 5 | 0.89 | 0.70 |

TABLE 3-continued

Emissivity after Exposure Test in Atmosphere of 800 (° C.)

| Exposure Time | Present Embodiment | Comparative Example |
| --- | --- | --- |
| 10 | 0.89 | 0.67 |
| 24 | 0.89 | 0.65 |
| 72 | 0.89 | 0.64 |

TABLE 4

Emissivity after Exposure Test in Atmosphere of 1000 (° C.)

| Exposure Time | Present Embodiment | Comparative Example |
| --- | --- | --- |
| 1 | 0.88 | 0.63 |
| 5 | 0.88 | 0.60 |
| 10 | 0.88 | 0.55 |
| 24 | 0.88 | 0.51 |
| 72 | 0.88 | 0.49 |

As is apparent from the above tables 3, 4 and FIGS. 10, 11, the glass coating of the present second embodiment in which the pigment particle constituted by the silicon carbide is provided at its surface with the silica glass layer 20 does not suffer from a reduction in the emissivity at all throughout the exposure test of 72 (hr), and keeps the emissivity after the exposure test at the value before the exposure test. In the glass coating of the comparative example in which the silica glass layer 20 is not provided on the surface of the pigment particle, on the other hand, the emissivity is considerably lowered in a short time during the test and tends to be further lowered with the time of the exposure to the test temperature of either 800(° C.) or 1000(° C.) at the time when the exposure time is substantially zero, as shown. This is further clarified by noting the emissivity value the comparative example at the temperatures of 800(° C.) and 1000(° C.) in FIG. 9. That is, the interface reaction between the pigment particles and the glass structure is restrained by covering each of the pigment particles with the silica glass layer 20, also in the case where the silicon carbide is used as the pigment particle, as in the case where the silicon tetraboride is used as the pigment particle, so that the pigment particles are accordingly restrained from being deteriorated.

The embodiments of the present invention have been explained in detail by reference to the drawings. The present invention can be carried out in some other modes.

For example, in the above illustrated embodiments, the high silica glass frit to which the boron oxide is added, or the glass frit which originally includes the boron oxide, is used to form the glass structure 16. However, it is also possible to use a glass frit which does not include boron oxide. The composition of the glass to be used is changed as needed depending upon the application of the structural body, the required degree of heat resistance, and emissivity of the structural body, and other factors.

Further, in the above illustrated embodiments, the silicon tetraboride whose average particle diameter is about 2 ($\mu$m), or the silicon carbide whose average particle diameter is about 0.3–0.5 ($\mu$m), is used as the pigment particles 18. However, the kind of the pigment particle may be suitably selected depending upon the application and required level of emissivity of the structural body, and the heat resistance of the pigment per se. The average particle diameter of the pigment particle may be suitably determined such that the determined diameter provides excellent dispersibility. For example, the silicon tetraboride of about 1–10 ($\mu$m) is preferably used where the silicon tetraboride is used as the pigment particles 18, while the silicon carbide of about 0.1–1 ($\mu$m) is preferably used where the silicon carbide is used as the pigment particles 18.

Further, in the embodiments, the perhydropolysilazane is used as the above illustrated inorganic high molecule for forming the silica glass film (silica glass layer 20) on the surface of each pigment particle (silicon tetraboride or silicon carbide powder) 18. However, the perhydropolysilazane may be replaced with some other inorganic high molecule which include such silicon that permits the inorganic high molecule to form the silica glass film through a suitable treatment such as a heat treatment as shown in the heat treatment step of step B4.

Further, in the above illustrated embodiments, the silicon dioxide purity in the silica glass layer 20 which covers the pigment particle 18 is about 99 (wt %). This value of the silicon dioxide purity in the silica glass layer 20 is suitably changed within a range which is higher than the value of the silicon dioxide purity in each portion of the glass structure 16 adjacent to the corresponding pigment particle 18. However, it is preferable to maximize the silicon dioxide purity in the silica glass layer 20, for restraining the interface reaction of the pigment particle 18. Thus, the silicon dioxide purity in the silica glass layer 20 is preferably 90 (wt %) or higher, and is further preferably 95 (wt %) or higher.

Further, in the first embodiment shown in FIG. 1, the amount of the boron oxide to be added to the glass frit is about 8.5 (wt %). However, the amount of addition is suitably determined by taking account of various factors such as the heat resistance and the strength of the glass structure 16 and the composition of the glass frit. Where the boron oxide is added to the glass frit not including the boron oxide, for example, the amount of addition is changed as needed within a range of 8–13 (wt %).

Further, in the above illustrated embodiments, the firing step is implemented to gradually heat the object in the nitrogen atmosphere. However, the atmosphere may be changed as needed, and the firing step may be implemented in an oxidizing atmosphere. This is because the interface reaction between the pigment particles and the glass structure 16 is not likely to occur owing to the silica glass which covers the pigment particle. Further, the nitrogen atmosphere may be changed to other non-oxidizing atmosphere like an atmosphere of inert gas such as argon, and the firing step may be implemented under vacuum.

It is to be understood that various values which define the composition or physical properties of the glass coating 10 such as a mixing ratio of the reaction cured glass material powder and the pigment particles are suitably determined according to the application of the structural body and other factors. Further, the above illustrated embodiments of the present invention have been explained as applied to the substrate 14 which is used as the heat insulator serving as a firing furnace, or the glass coating 10 which is provided on the heat resistant alloy used for an engine part. However, it is to be understood that the present invention can be applied to various fields of art in which the high emittance of the glass coating 10 is utilized. That is, the present invention can be preferably applied for various purposes, for instance, a coating material for a refractory furnace, an outer wall of a gas pipe serving as a combustion burner, a hot plate of a heat exchanger, a heat insulator for a nuclear furnace, a turbine blade, a UV-cut light transparent glass, a roof tile (for increasing its snow removal capacity), a substrate of semiconductors or electronic parts, a packing material for the semi-conductors or electronic parts (for facilitating the heat radiation), and a grinding wheel (for facilitating the radiation of grinding heat).

It is to be understood that the present invention may be embodied with various modifications without departing from the spirit of the invention, although such possible modifications are not illustrated in the present specification.

What is claimed is:

1. A method of manufacturing a high emittance glass coating which has a glass structure in that pigment particles having a predetermined degree emissivity are dispersed, and which is provided on a surface of a specific structural body, said method including a paste preparation step of preparing a paste which includes said pigment particles and a specific glass powder, a paste coating step of applying said paste to said surface of said specific structural body, and a heat treatment step of forming said glass structure from said glass powder by heating said paste which has been applied to said surface, said method comprising:

a pigment-particle covering step of providing on surface of each of said pigment particles a pigment covering film having a predetermined thickness, said pigment covering film including silicon dioxide such that a content of said silicon dioxide in said pigment covering film is higher than a content of said silicon dioxide in each portion of said glass structure which is adjacent to a corresponding one of said pigment particles, said pigment-particle covering step being implemented prior to said paste preparation step, wherein said pigment-particle covering step includes:

an inorganic-high-molecular-weight-film forming step of forming an inorganic high molecular weight film on said surface of said each of said pigment particles, said inorganic high molecular weight film being constituted by a high weight inorganic molecule which includes silicon, and wherein perhydropolysilazane is used as said high weight inorganic molecule in said inorganic-high-molecular-weight-film forming step.

2. A method of manufacturing said high emittance glass coating according to claim 1, wherein said pigment-particle covering step further includes:

a heating and forming step of heating said each of said pigment particles having said inorganic high molecular weight film formed thereon, at a predetermined temperature in an oxidizing atmosphere, so that said pigment covering film having said content of said silicon dioxide is formed from said inorganic high molecular weight film.

3. A method of manufacturing said high emittance glass coating according to claim 1, wherein said inorganic-high-molecular-weight-film forming step includes:

a pigment-particle dispersing step of dispersing said pigment particles in a liquid including said high weight inorganic molecule, for preparing a dispersion liquid; and a spray-drying step of spray-drying said dispersion liquid, for forming said inorganic high molecular weight film on said surface of said each of said pigment particles.

4. A method of manufacturing said high emittance glass coating according to claim 1, wherein said pigment particles and said glass powder are dispersed together with an organic binder in an organic solvent in said paste preparation step.

5. A method of manufacturing said high emittance glass coating according to claim 1, wherein said paste is sprayed on said surface in said paste coating step.

6. A method of manufacturing said high emittance glass coating according to claim 1, wherein said paste is heated in a non-oxidizing atmosphere in said heat treatment step.

7. A method of manufacturing said high emittance glass coating according to claim 1, wherein a borosilicate glass which includes said silicon dioxide as its principal component and also includes boric acid is used as said glass powder in said paste preparation step.

8. A high emittance glass coating material used for forming the high emittance glass coating defined in claim 1.

9. A high emittance glass coating material according to claim 8, wherein said glass structure is a borosilicate glass which includes said silicon dioxide as its principal component and also boric acid such that said content of said silicon dioxide in said each portion of said glass structure is approximately 80 (wt %).

10. A high emittance glass coating material according to claim 8, wherein said content of said silicon dioxide in said pigment covering film is at least 85 (wt %).

11. A high emittance glass coating material according to claim 8, wherein said content of said silicon dioxide in said pigment covering film is at least 99 (wt %).

12. A high emittance glass coating material according to claim 8, wherein an average thickness of said pigment covering film is approximately 0.5 ($\mu$m).

13. A high emittance glass coating material according to claim 8, wherein each of said pigment particles is boron silicide.

14. A high emittance glass coating material according to claim 8, wherein each of said pigment particles is silicon tetraboride.

15. A high emittance glass coating material according to claim 8, wherein each of said pigment particles is silicon tetraboride in the form of particles whose average diameter is approximately 2 ($\mu$m).

16. A high emittance glass coating material according to claim 8, wherein each of said pigment particles is a silicon tetraboride in the form of particles whose diameters range approximately from 1 ($\mu$m) to 10 ($\mu$m).

17. A high emittance glass coating manufactured according to the method defined in claim 1.

18. A high emittance glass coating according to claim 17, wherein said glass structure is a borosilicate glass which includes said silicon dioxide as its principal component and also boric acid such that said content of said silicon dioxide in said each portion of said glass structure is approximately 80 (wt %).

19. A high emittance glass coating according to claim 17, wherein said content of said silicon dioxide in said pigment covering layer is at least 85 (wt %).

20. A high emittance glass coating according to claim 17, wherein said content of said silicon dioxide in said pigment covering layer is at least 99 (wt %).

21. A high emittance glass coating according to claim 17, wherein an average thickness of said pigment covering layer is approximately 0.5 ($\mu$m).

22. A high emittance glass coating according to claim 17, wherein each of said pigment particles is boron silicide.

23. A high emittance glass coating according to claim 17, wherein each of said pigment particles is silicon tetraboride.

24. A high emittance glass coating according to claim 17, wherein each of said pigment particles is silicon tetraboride in the form of particles whose average diameter is approximately 2 ($\mu$m).

25. A high emittance glass coating according to claim 17, wherein each of said pigment particles is silicon tetraboride in the form of particles whose diameters range approximately from 1 ($\mu$m) to 10 ($\mu$m).

* * * * *